United States Patent
Usami

(10) Patent No.: US 7,327,489 B2
(45) Date of Patent: Feb. 5, 2008

(54) IMAGE PROCESSING DEVICE AND COMPUTER PROGRAM PRODUCT THEREFOR

(75) Inventor: Yasushi Usami, Wakayama (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 979 days.

(21) Appl. No.: 10/615,036

(22) Filed: Jul. 9, 2003

(65) Prior Publication Data

US 2004/0008355 A1    Jan. 15, 2004

(30) Foreign Application Priority Data

Jul. 11, 2002    (JP)    ............... 2002-202661

(51) Int. Cl.
G06K 15/00    (2006.01)
G06F 3/12    (2006.01)
(52) U.S. Cl. .................. 358/1.16; 358/1.18; 358/1.15
(58) Field of Classification Search ............... 358/1.16, 358/1.17, 1.9, 1.2, 1.1, 1.15, 518, 1.18, 1.13, 358/404, 407, 444, 468; 382/162, 167; 347/2, 347/3, 5; 399/1
See application file for complete search history.

(56) References Cited

U.S. PATENT DOCUMENTS 6,295,117 B2    9/2001    Haraguchi et al.

6,295,136 B1 *    9/2001    Ono et al. .................. 358/1.15

FOREIGN PATENT DOCUMENTS

| JP | 6-222465 A | 8/1994 |
| JP | 11-305341 A | 11/1999 |
| JP | 2000092260 A | * 3/2000 |
| JP | 2000-352771 A | 12/2000 |

* cited by examiner

Primary Examiner—Dov Popovici
(74) Attorney, Agent, or Firm—Smith Patent Office

(57) ABSTRACT

Image data files are stored in correspondence with specified print size and quantity in an image data memory of an image processing device, and properly corrected by an image corrector. Two pieces of information about the print size, one inputted by an operator and the other detected by a paper detector, are stored in a print size memory. Only the image data file in correspondence with the print size which is the same as the set size is supplied to a printer by an image data supply controller. Other files are temporarily stored in a HD. After the operator changes the setting of the print size in response to a signal outputted from a demanding signal output controller, an image data retriever extracts only the image data file in correspondence with the newly-set print size from the files stored in the HD, and then stores the extracted file into the image data memory.

8 Claims, 6 Drawing Sheets

IMAGE PROCESSING DEVICE AND COMPUTER PROGRAM PRODUCT THEREFOR

BACKGROUND OF THE INVENTION

1. Field of the Invention

The present invention relates to an image processing device for carrying out printing process for images in plurality of print sizes, and a computer program product for the image processing device.

2. Description of Related Art

According to a conventional order style for photograph prints, it is a general manner for customers to bring negative films of photographs to photograph lab shops (photograph stands) and orally specify desirable print sizes, the number of prints etc, for each photograph there. However, such a conventional order style for photograph prints has been recently diversified into various styles such as ordering on the Internet for images taken by a digital camera, ordering by using a recording medium like CD-ROM, etc. In the conventional order style, a shutter bug might request a special print size, although it is very rare. However, in the recent diversified order styles, it has been more popular that customers request not only L-size but also various other sizes because ordering formats are improved so that customers can easily select various print sizes and also customers cannot help paying their attention to a size selection column.

Normally, only one type of paper is loaded in a printer, and therefore, in order to carry out printing process in plurality of print sizes, an operator must exchange papers, which is troublesome. Although a printer in which two or more kinds of paper different in size can be loaded together is known, even in this case, in order to change a printing paper size, an operator must rewind the paper in-use, change the setting of the printer in conformity with the size of paper to be used next, etc. Thus, it is troublesome to change the size of printing paper.

As described above, troublesome work is required to perform printing process in plurality of print sizes. Accordingly, in case plurality of print sizes are specified for plurality of image data files in one order, a clerk in a photograph lab shop who takes the order tends to print images in correspondence with the same print size as collectively as possible. In this case, after loading paper in a certain size, a printer is set in conformity with the loaded paper size, all the image data files in one order are read out, correction such as color correction is carried out only for the image data files in correspondence with the set print size, and then only the corrected image data files in correspondence with the set print size are used for printing process. Thereafter, in order to print in another size, the paper currently loaded in the printer must be exchanged by another paper different in size, and then the setting of the printer in conformity with the paper size, the reading of all the image data files in the order, the correction and the printing process must be carried out again.

As described above, when printing is performed in plurality of print sizes, under the present condition, an operator must carry out not only the setting of the print size for the printer and the exchange of papers, but also the reading of the image data files and the correction at the frequency equal to the number of the print size. In the conventional order style, this trouble some work is not so serious problem because printing in a special size is rarely requested. However, in the resent printing process in which printing needs to be performed in various sizes in one order, not only very troublesome work and much time and labor are needed, but also such a mistake as an operator forgets to print some images with the idea of using image data files in correspondence with a certain size afterwards may occur.

SUMMARY OF THE INVENTION

An object of the present invention is to provide an image processing device with which printing can be efficiently performed even when printing in plurality of print sizes is required and a computer program product for the image processing device.

According to a first aspect of the present invention, an image processing device comprises an image data memory for storing one or plurality of image data files in correspondence with at least any one of plurality of print sizes, an image corrector for carrying out correction for the one or plurality of image data files stored in the image data memory, and an image data supply controller for controlling the one or plurality of image data files stored in the image data memory to be supplied to a printer so that each of the image data files is used for printing in a corresponding print size in accordance with the image data memory and an image data file in correspondence with a print size is prevented from being mixed with an image data file in correspondence with another print size.

In this construction, since image data files stored in the image data memory are supplied to the printer so that an image data file in correspondence with a print size can be prevented from being mixed with an image data file in correspondence with another print size, after all the image data files to be used for printing are collectively stored in the image data memory by one operation, image data files needing the correction of the stored image data files can be collectively processed by one operation. Accordingly, the number of works regarding the reading of data files and the image correction can be greatly reduced. Furthermore, while an operator hitherto must identify which image data file in an order should be corrected every time the print size is changed, the present invention can eliminate such an operator's identification work. Thus, reduction of labor imposed on an operator, great reduction of time for printing, and enhanced operability can be achieved.

The image data file to be supplied to the printer may be a data file that has been corrected or has not yet been corrected.

According to a second aspect of the present invention, an image processing device comprises an image data memory for storing one or plurality of image data files in correspondence with at least any one of plurality of print sizes, an image corrector for carrying out correction for the one or plurality of image data files stored in the image data memory, a print size memory for storing a print size for a printer, and an image data supply controller for controlling an image data file in correspondence with the same print size as stored in the print size memory, of the one or plurality of image data files stored in the image data memory, to be supplied to the printer so as to be used for printing in a corresponding print size.

In this construction, since every time the print size stored in the print size memory is changed, image data files in correspondence with the print size same as that newly stored in the print size memory are supplied to the printer, after all the image data files to be used for printing are collectively stored in the image data memory by one operation, image data files needing the correction of the stored image data files can be collectively processed by one operation. Accordingly, the same advantage as the above-mentioned image processing device of the first aspect can be achieved.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
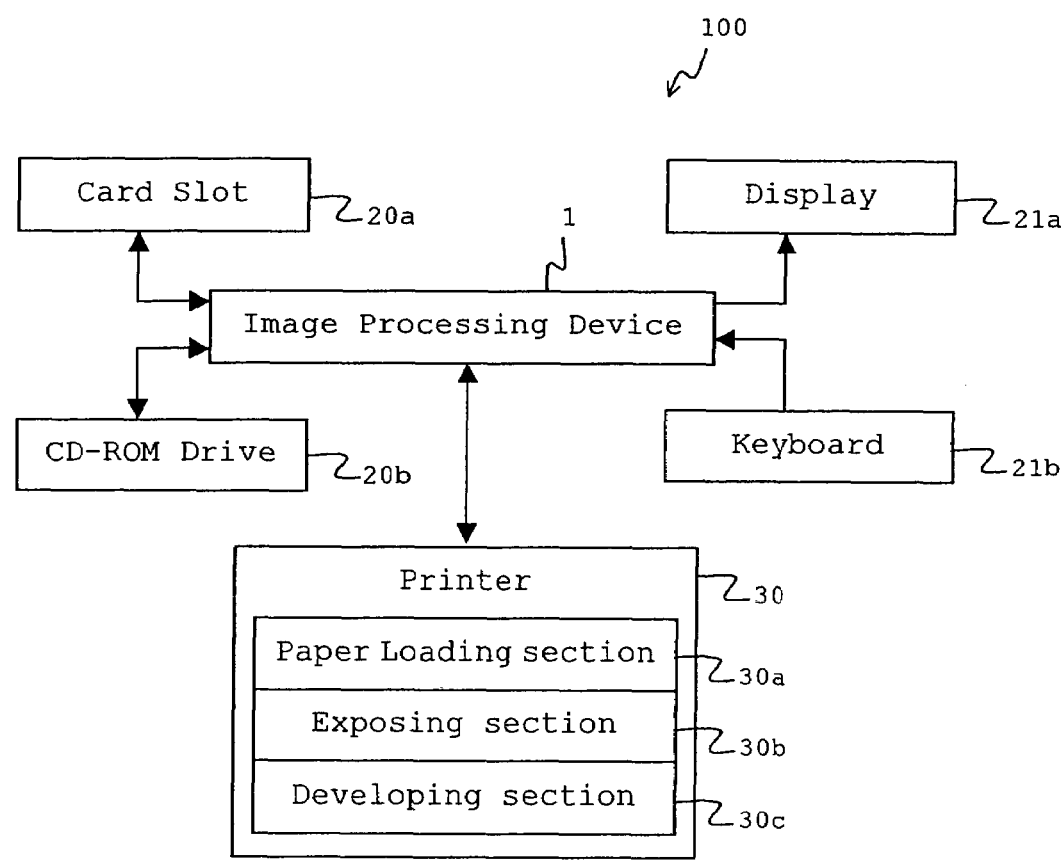
FIG. 1 is a block diagram showing a construction of an example of a photograph processing device including an image processing device according to an embodiment of the present invention.

FIG. 1 shows a construction of an example of a photograph processing device including an image processing device according to an embodiment of the present invention. In this example, the photograph processing device 100 is equipped with an image processing device 1 described in detail later, and a printer 30 for carrying out printing on the basis of image data files supplied from the image processing device 1. The image processing device 1 is connected to a card slot 20a and to a CD-ROM drive 20b with data exchangeable. The image processing device 1 is designed to read image data files recorded in a recording medium such as a memory card, CD-ROM or the like, and then to store the image data files into an image data memory 11 (see FIG. 2), described later, of the image processing device 1. Furthermore, the image processing device 1 is connected to input means such as a keyboard 21b, a mouse (not shown), etc., and also to output means such as a display 21a or the like to display various information including images.

The printer 30 connected to the image processing device 1 comprises a paper loading section 30a for loading a magazine in which print paper such as photographic paper or the like is contained, an exposing section 30b for exposing light to paper on the basis of image data files stored in the image data memory 11 (see FIG. 2) of the image processing device 1 described later, and a developing section 30c for conducting processes such as development, beach-fixing, stabilization, drying, etc. for the paper on which a latent image is formed by the exposing section 30b and then discharging them out.

The image processing device 1 has not only a function of transferring image data to an exposure head in the exposing section 30b of the printer 30, but also a function of overall control on image forming, which is performed in the exposing section 30b, the developing section 30c, a conveying section (not shown) for conveying paper, etc. Therefore, the paper conveying and the light exposure timing in the printer 30 are controlled by the image processing device 1, whereby the proper printing is carried out.

A photograph processing device including the image processing device 1 according to the embodiment of the present invention is not limited to the above example, but various design changes maybe made. For example, although in the above example the exposing section 30b and the developing section 30c conduct the light exposure and the developing on the print paper respectively so as to form the image thereon, the image may be formed by jetting ink like an ink-jet printer. In addition, various modifications maybe made to the constituent elements connected to the image processing device 1.

The image processing device 1 shown in FIG. 1 consists of a general-purpose personal computer. In the computer, hardware such as CPU, ROM, RAM, hard disk, etc. are stored, wherein the hard disk comprises various kinds of software including a program, which may be installed in any computer with recorded in a removable type of record medium such as CD-ROM, FD, MO or the like, for allowing the computer to function as the image processing device 1. The respective parts 10 to 18 (see FIG. 2) described later are constructed by combining the above-mentioned hardware and the software each other.

Figure 2:
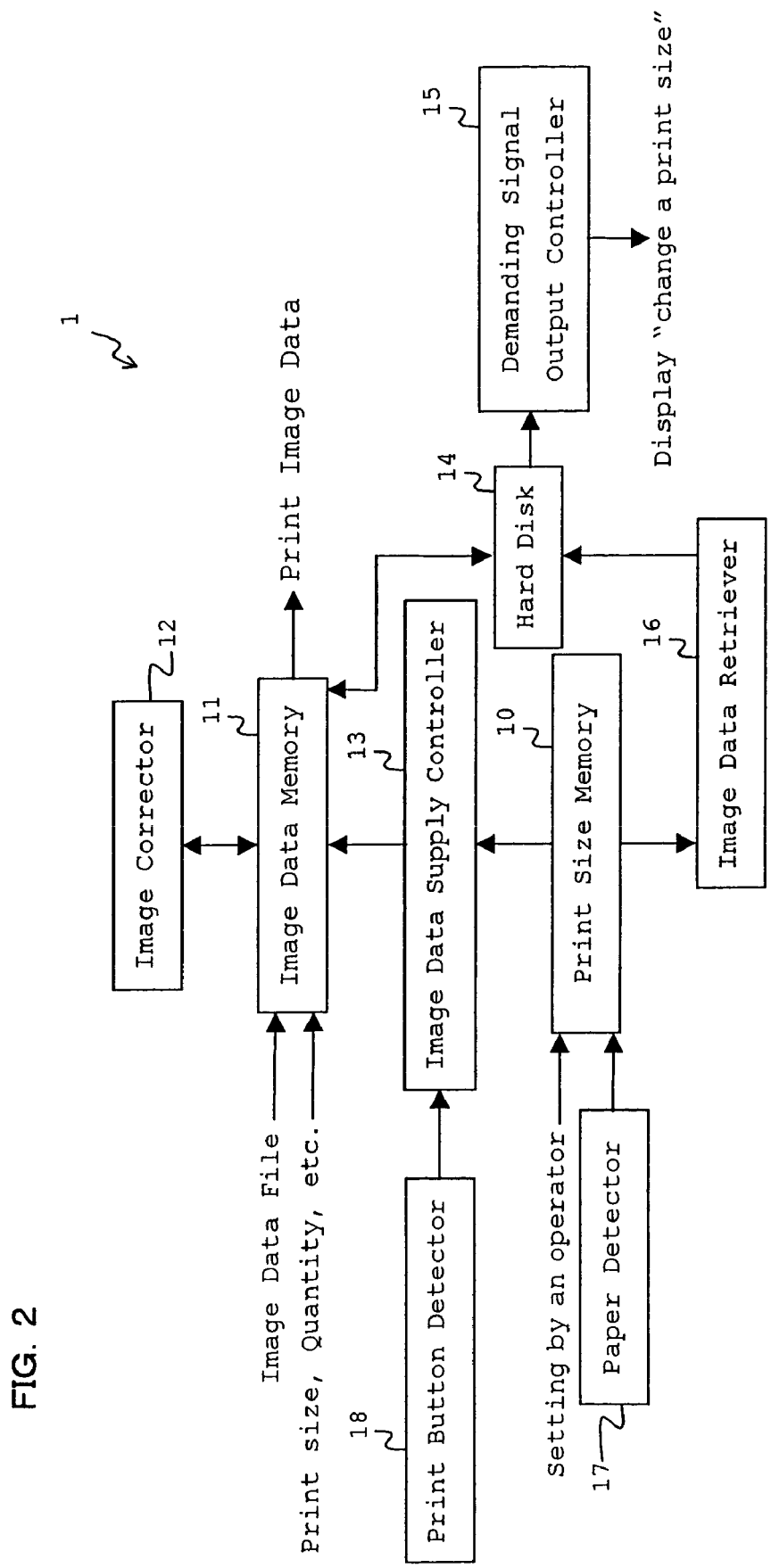
FIG. 2 is a block diagram showing a construction of the image processing device according to the embodiment of the present invention.
Figure 3:
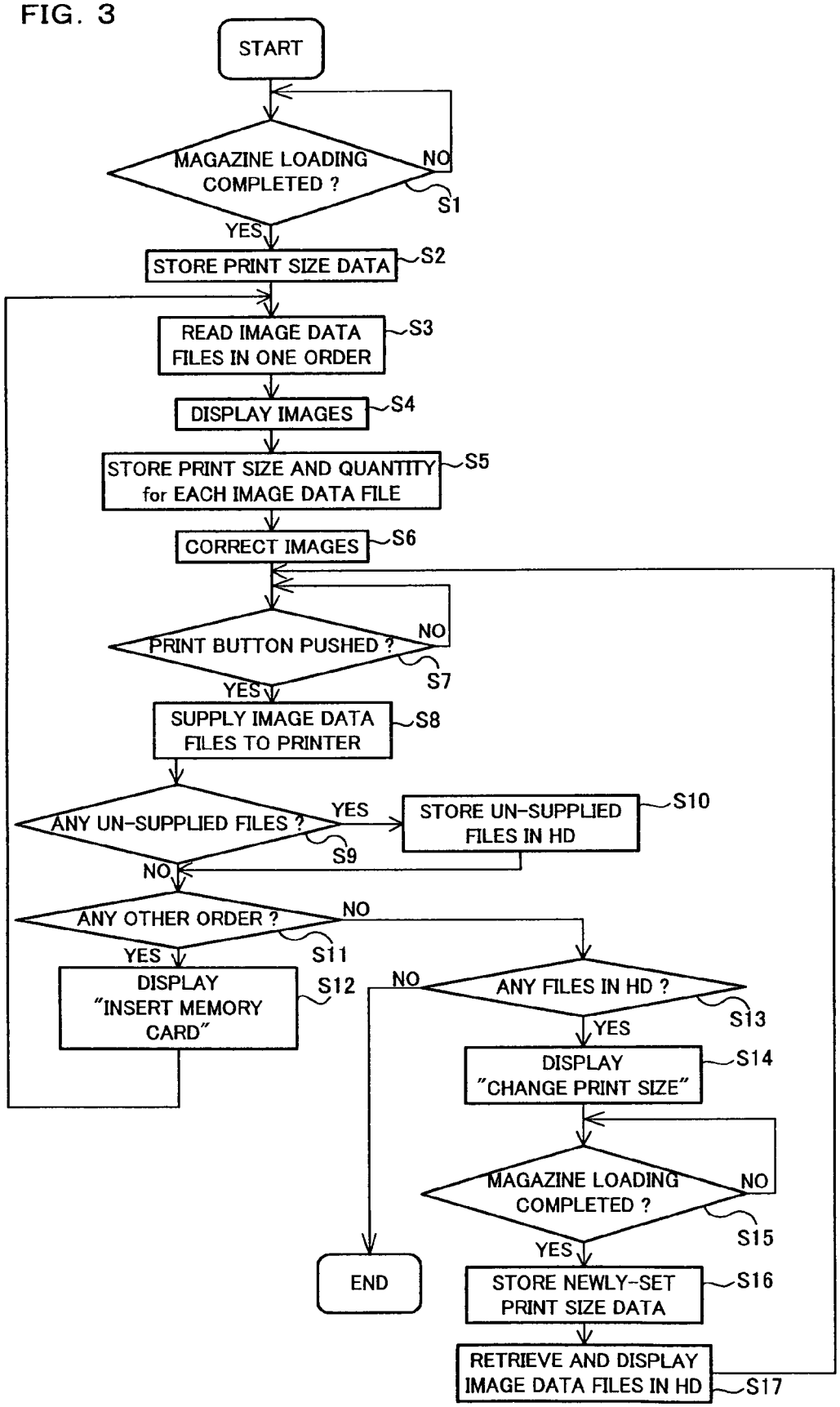
FIG. 3 is a flowchart of a process carried out by the image processing device shown in FIG. 2.

Next, a construction of the image processing device 1 according to the embodiment of the present invention shown in FIG. 1 and a program used in the image processing device 1 will be described with reference to FIGS. 2 and 3. FIG. 2 shows the construction of the image processing device 1 according to the embodiment, and FIG. 3 shows the process in the program which can be used in the image processing device 1 shown in FIG. 2.

The program described below is an example of the process carried out by the image processing device 1 of this embodiment. In this example, it is assumed that three print sizes (PC-size, L-size and 2L-size) are prepared. One of the three print sizes and the number of prints are respectively specified for one image data file. The following description is made on the assumption that two orders X and Y are provided, the order X ordering three prints of PC-size, two prints of L-size and one print of 2L-size while the order Y ordering three prints of PC-size and eight prints of L-size. It is further assumed that image data files in each order are recorded in an recording medium respectively. In this embodiment, two memory cards, in which image data files in the orders X and Y are stored respectively, are prepared.

In this embodiment, not only images in the read files but also a list of process status regarding each order or all orders as described in detail later can be displayed on the display 21a in the process flow of the image processing device 1.

The image processing device 1 of this embodiment is provided with a paper detector 17 as shown in FIG. 2. The paper detector 17 is used to detect whether a magazine has been loaded in the paper loading section 30a of the printer 30 shown in FIG. 1, and also to detect the size of paper contained in the loaded magazine. When a magazine has not yet been loaded, NO in step S1, the paper detector 17 does not detect that the loading is completed, and thus the process does not go to the next step. After an operator selects any one of the three print sizes of PC-size, L-size, 2L-size at his/her discretion and completes loading of a magazine in which paper of the selected print size is contained, the paper detector 17 detects that the loading is complete, YES in step S1.

Subsequently, the paper detector 17 further detects the size of the paper contained in the loaded magazine, and the detected size is stored in a print size memory 10 in step S2. On the other hand, the operator inputs the selected print size data by way of the input means such as the keyboard 21*b* shown in FIG. 1 or the like to transmit the print size data to the print size memory 10 of the image processing device 1.

As shown in FIG. 2, two pieces of information about the print size, one inputted by the operator and the other detected by the paper detector 17, are stored in the print size memory 10. These print sizes are required to be coincident with each other. In case these print sizes are different, it may be estimated that a magazine containing paper whose size is different from the print size input by the operator has been loaded by mistake. When the print size inputted by the operator is different from the print size detected by the paper detector 17, the printing cannot be properly performed. In such a case, an error message or the like is preferably delivered to the operator, for example, by the display 21*a* shown in FIG. 1 on which the message is displayed.

In this example, it is assumed that an operator first selects the PC-size, loads a magazine in which paper of the selected size is contained, and inputs the size by using the input means.

After a memory card in which image data files in the order X are stored is inserted into the card slot 20*a* shown in FIG. 1, the image data files in the order are read out into the image data memory 11, in step S3. Information including images in the read files is displayed on the display 21*a* of FIG. 1, which allows the operator to recognize it, in step S4.

The memory card inserted in the card slot 20*a* also stores the print size and the number of prints (quantity) for each of the image data files. The print size and quantity are stored in the image data memory 11 to be in correspondence with the each image data file, in step S5. In case of an order format on the Internet, in the same manner, print size and quantity specified for each image data file are stored in the image data memory 11 respectively in correspondence with the each image data file. The print size and quantity specified for each image data file may be inputted from the keyboard 21*b* of FIG. 1 by an operator so as to be transmitted to the image data memory 11.

Figure 4:
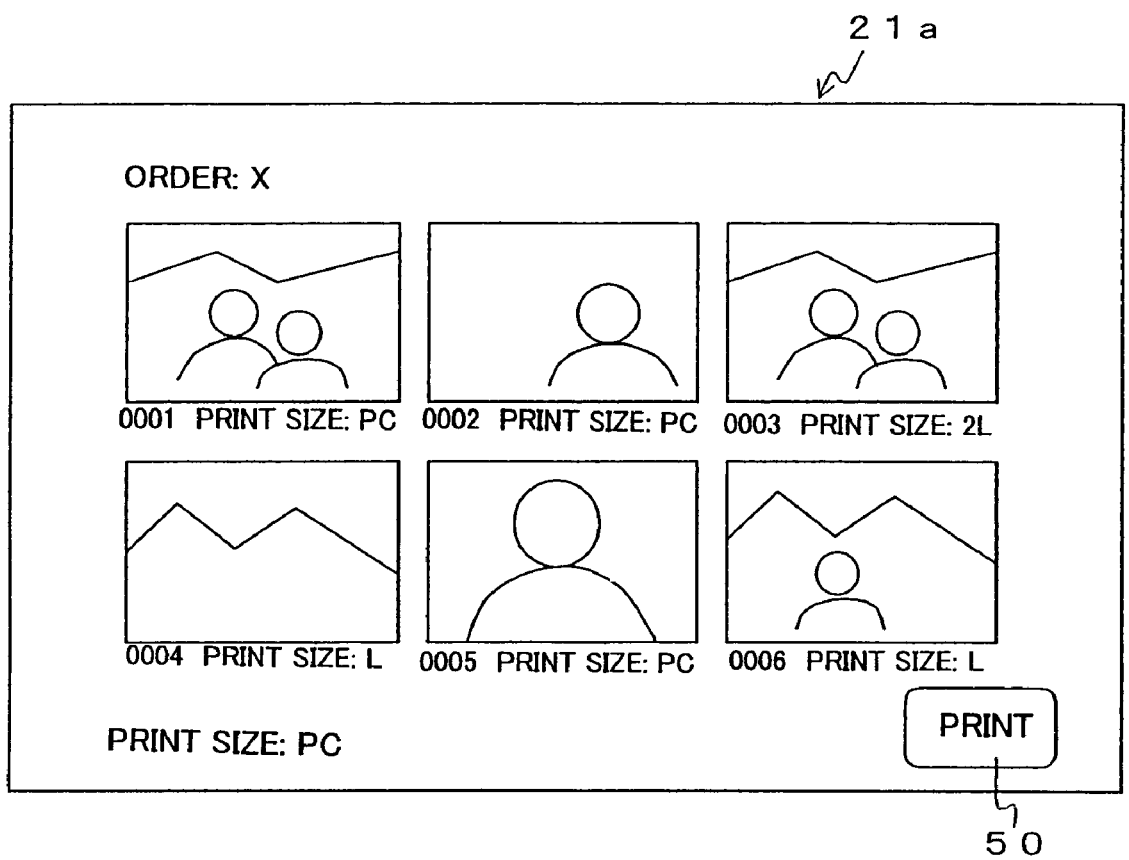
FIG. 4 is a schematic diagram showing a picture on a display in the process of the image processing device shown in FIG. 2.

Subsequently, image correction for color, sharpness, etc. is carried out for each of the image data files stored in the image data memory 11 by an image correcting section 12 shown in FIG. 2, in step S6. Preferably, at this time, such a picture as shown in FIG. 4 is displayed on the display 21*a* so that the operator can adjust each image so as to become desired with watching the picture. In addition, each file name and the specified print size is respectively displayed at the lower side of the corresponding image. The order name and the set print size are displayed at the upper left side and the lower left side on the display 21*a* respectively, and a click portion 50 to be clicked for starting the printing is displayed at the lower right side of the display 21*a*.

In case the operator judges that the image correction is unnecessary, the step S6 may be omitted.

As shown in FIG. 2, the image processing device 1 further comprises a print button detector 18. The print button detector 18 is used to detect, for example, push of a "print" key on the keyboard 21*b* or click of a "print" button 50 by a mouse in FIG. 4. When neither the "print" key is pushed nor the "print" button 50 is clicked by the operator, NO in step S7, the process does not go to any next step. On the other hand, when either the push of the "print" key or the click of the "print" button is detected by the print button detector 18, YES in step S7, a signal is transmitted from the print button detector 18 to an image data supply controller 13, as shown in FIG. 2.

The image data supply controller 13 which is supplied with the signal from the print button detector 18 outputs a command to the image data memory 11 so that the image data memory 11 supplies the printer 30 with only the image data file in correspondence with the print size same as stored in the print size memory 10, of the image data files stored in the image data memory 11. From the image data memory 11 having received such a command, the image data files in correspondence with the set print size are supplied to the printer 30 in step S8, while being scaled so as to be used for printing in the corresponding print size.

In this example, since the print size is set to the PC-size at this time, totally three image data files (file names: 0001, 0002, 00005) shown in FIG. 4 each in correspondence with the PC-size are supplied from the image data memory 11 to the printer 30 with image scaled to be used for printing in the PC-size.

Subsequently, it is judged whether there is any image data file, which has not yet been supplied to the printer 30, in the image data memory 11. In this example, three image data files (file names: 0003, 0004, 0006) have correspondence with a print size of L-size or 2L-size different from the set print size (PC-size). Accordingly, the three image data files have not yet been supplied to the printer 30 and are still stored in the image data memory 11 as shown in FIG. 4. Therefore, it is judged that un-supplied data files exist, YES in step S9, and the three image data files are stored in HD (hard disk) 14 shown in FIG. 2 in step S10.

Preferably, the image data file is stored in HD 14 with its name rewritten by adding information on the print size and the number of prints (quantity) to the original name in the image data memory 11, for example, from "0004" to "0004_L_1". Furthermore, in HD 14, the image data files are respectively stored in a holder for each order.

Figure 5:
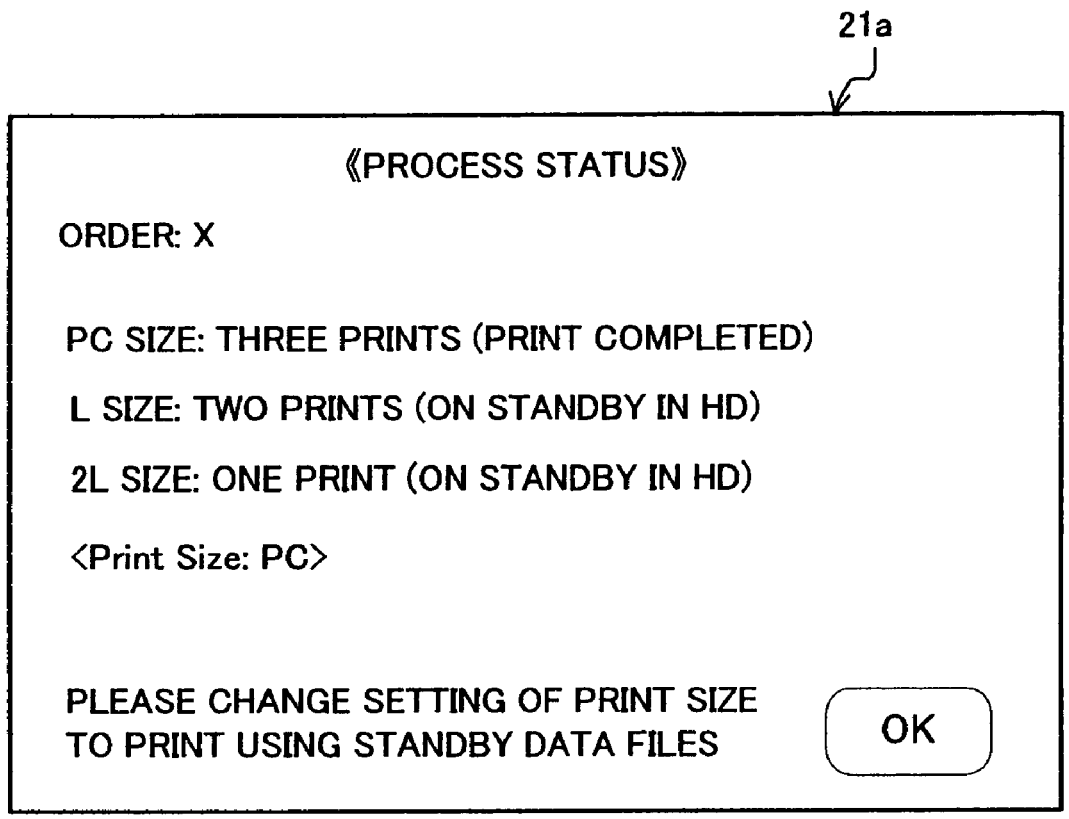
FIG. 5 is a schematic diagram showing an example of a list of process status regarding each order on a display in the process of the image processing device shown in FIG. 2.

Displaying the list of process status regarding the order X on the display 21*a*, at this time, allows the operator to recognize such information as shown in FIG. 5. The picture on the display 21*a* can be mutually switched from this list to a normal display shown in FIG. 4. When the operator clicks an "OK" portion on the display 21*a* of FIG. 5 after checking the process status, the list display is switched to the normal display on which the images are shown.

Subsequently, "another order? Y/N" or the like is displayed on the display 21*a* with the normal display thereon, for example. If the operator inputs or clicks "Y" or "N", it is judged whether there is another order in step S11. In this example, there is an order Y other than the order X. When the operator having recognized such a display as described above inputs "Y", it is judged that there is another order, YES in step S11, and a command of "insert memory card" is displayed on the display 21*a* in step S12.

The operator having recognized the command of "insert memory card" inserts a new memory card in which the image data files of the order Y are stored into the card slot 20*a* of FIG. 2. The process of reading the image data files in one order into the image data memory 1 in step S3 is carried out in the same manner as described above. The process of the steps S4 to S7 are also carried out subsequently in the same manner as described above. In this example, there are three image data files to be used for printing in the PC-size in the order Y. Thus, after push of the "print" button is detected in step S7, the three image data files, for which the PC-size printing is specified, of the files in the order Y are supplied to the printer 30 in step S8.

The order Y contains eight image data files in correspondence with a print size of L-size different form the set print size (PC-size). The eight image data files are still stored in the image data memory 11 without being supplied to the printer 30. Accordingly, it is judged that un-supplied data files exist, YES in step S9, and the eight image data files are stored in HD 14 shown in FIG. 2.

At this time, the three image data files of the order X and the eight image data files of the order Y are stored in HD 14.

Now, the process of reading the image data files of the orders X, Y is completed. Subsequently, when the operator having recognized such a display as "another order? Y/N" on the display 21a inputs "N", for example, it is judged that there is no other order to be printed, NO in step S11. At this time, the reading of all the image data files of the orders to be used for printing is completed. Also, the printing process for the set print size (PC-size) is finished.

It is further judged whether any image data file is stored in HD 14 in step S13. In this example, the three image data files of the order X and the eight image data files of the order Y are stored in HD 14. Thus, it is judged that image data files exist in HD 14, YES in step S13. Having received information that data files exist in HD 14, a demanding signal output controller 15, shown in FIG. 2, outputs a signal to the display 21a so as to display a command of "change print size" in step S14.

The operator having recognized the command of "change print size" selects any one of the print sizes which have not yet been on the printing process, unloads the magazine containing the paper of Pc-size for which the printing process has been finished, from the paper loading portion 30a of the printer 30, and loads a new magazine containing paper whose size is the same as newly selected.

The command on the display at this time is not limited to "change print size", but it may be "change to L-size" specifying a new print size with reference to the file name (e.g., "0004_L_1"), which is added on information of the print size and quantity, of the image data file in HD 14.

Subsequently, the same detection is carried out as described above by the paper detector 17 for detecting the completion of the magazine loading in step S1. It is judged that the magazine loading has not yet been completed, NO in step S15, as far as the operator has not finish the magazine exchange work, and the process does not go to any next step. When the operator has finished the magazine exchange work, the paper detector 17 detects that the magazine loading has been completed, YES in step S15, and in the same manner as mentioned above for steps S1 and S2, the size of the paper contained in the newly-loaded magazine is detected by the paper detector 17. The detected size is stored as a new print size in the print size memory 10 in step S16. The setting of the print size by the operator and the judgement on coincidence or non-coincidence between the print size inputted by the operator and the print size detected by the paper detector 17 are carried out in the same manner as described above.

Thus, when the storage content of the print size memory 10 has been changed, an image data retriever 16 shown in FIG. 2 detects this change and outputs a signal to HD 14. HD 14 having received the signal from the image data retriever 16 extracts only the image data files in correspondence with the newly-set print size from the image data files stored in HD 14, and then stores the extracted image data file into the image data memory 11 in step S17.

In this example, it is assumed that the operator having recognized the command of "change print size" in step S14 selects the L-size as the newly-set print size. The operator unloads the magazine containing the PC-size paper from the paper loading section 30a and then loads a magazine containing L-size paper into the paper loading section 30a. Thereby, information that the print size is set to the L-size is stored in the print size memory 10 in step S16. Thereafter, in step S17, the image data files in correspondence with the L-size (order X: two image data files having names of 0004 and 0006, order Y: eight image data files) are extracted from the HD 14 and then stored in the image data memory 11.

After the image data files in correspondence with the newly-set L-size print has been transmitted to the image data memory 11, as described above, the corresponding images is shown on the display 21a. Then, the process returns to step S7. Thereafter, when the operator pushes the print button, the image data files in correspondence with the L-size print of all the orders X, Y are scaled so as to be used for printing in the L-size and supplied to the printer 30 in step S8.

At this time, there is no un-supplied data file in the image data memory 11. Therefore, it is judged that there is no un-supplied data file, NO in step S9, and "another order? Y/N" is displayed on the display 21a in the same manner as described above in step S11.

Figure 6:
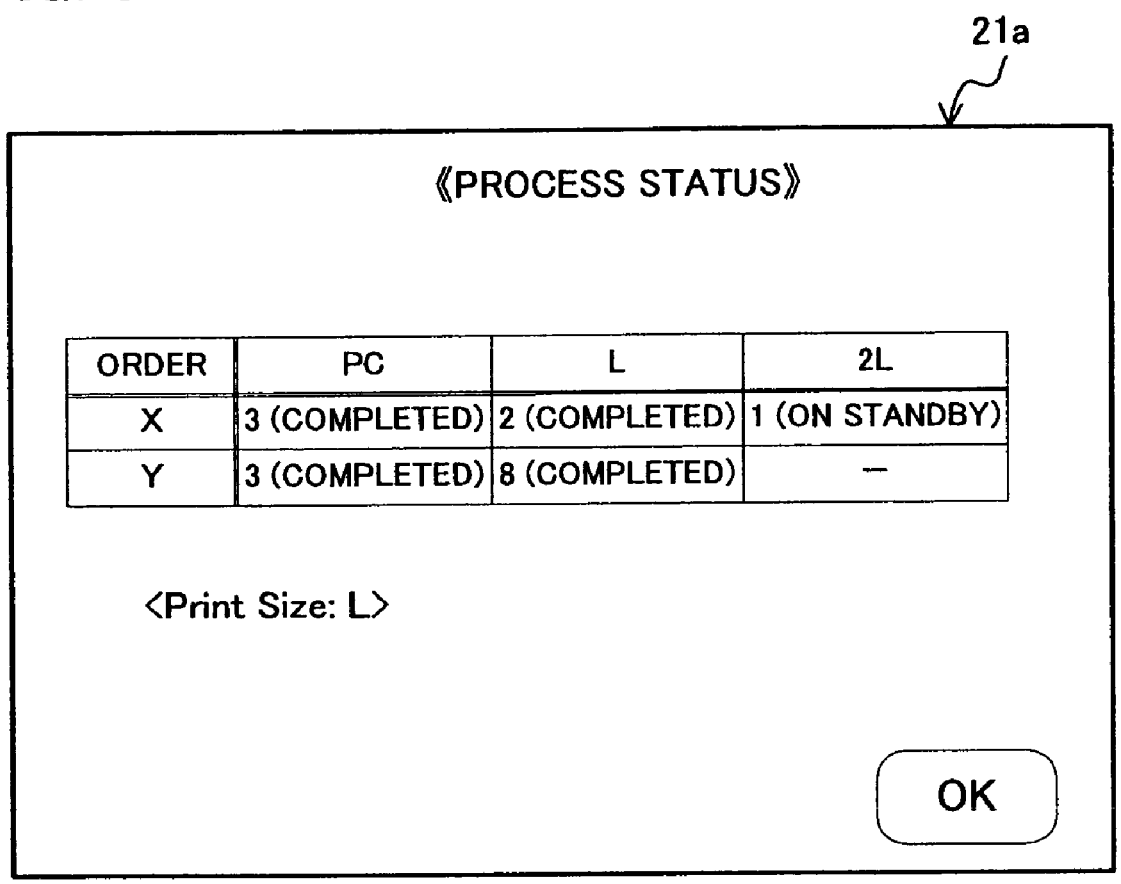
FIG. 6 is a schematic diagram showing an example of a list of process status regarding all orders on a display in the process of the image processing device shown in FIG. 2.

At this time, if the picture on the display 21a is switched to show a list of process status regarding all the orders, the operator can recognize information such as shown in FIG. 6. As is apparent from FIG. 6, at this time, the printing in the PC-size and L-size has been finished, while the printing in the 2L-size, with which one image data file of the order X has correspondence, has not yet. However, the print size is still set to the L-size.

Subsequently, when the picture on the display 21a is returned to the normal display and the operator inputs or clicks "N", it is judged that there is no other order, NO in step S11, and then it is judged again whether there is any image data file in HD 14 in step S13.

At this time, only the image data file, which name is 0003 of the order X, in correspondence with the 2L-size exists in HD 14 as described above. Accordingly, it is judged that an image data file exists in HD 14, YES in step S13, the paper exchange work is carried out and the print size is set to the corresponding size in the same manner as described above, and the image data file is supplied to the printer 30 so as to be used for printing in the 2L-size.

When all the image data files in correspondence with the three print sizes respectively have been supplied to the printer 30, it is judged that there is no data file in HD 14, NO in step S13. Thereby, the process of the image processing device 1 finishes.

As described above, according to the image processing device 1 of this embodiment, only the image data file in correspondence with the selected print size stored in the print size memory 10, of all the image data files stored in the image data memory 11, is supplied to the printer 30 by the image data supply controller 13. That is, the image data files specified to be used for printing in various print sizes are controlled to be supplied to a printer so that an image data file in correspondence with a print size is prevented from being mixed with an image data file in correspondence with another print size. Therefore, after all the image data files to be used for printing are collectively stored in the image data memory 11 by only one operation, image data files needing the correction by the image corrector 12, of the stored image data files, can be collectively processed by only one operation. This can greatly reduces the number of works needed for the reading of data files in step S3 and the image correction in step S6, as shown in FIG. 3.

Furthermore, while an operator hitherto must identify which image data file in an order should be corrected every time the print size is changed, the present invention can eliminates such an operator's identification work. Thus, reduction of labor imposed on an operator, great reduction of time for printing, and enhanced operability can be achieved.

According to the image processing device 1 of this embodiment, an image data file which has not yet been supplied to the printer 30, that is, an image data file in correspondence with a print size different from the currently set print size is stored in HD 14 in step S10 under the control of the image data supply controller 13. Thereafter, when the setting of the print size is altered, only the image data file in correspondence with a newly set print size is extracted from HD 14 and then stored in the image data memory 11 by the image data retriever 16. This is particularly effective to such a situation that the storage capacity of the image data memory 11 is not sufficient for many and large image data files, the power of the image processing device 1 is scheduled to be temporarily turned off, the printing interval between orders is long, etc.

Furthermore, the image processing device is equipped with the demanding signal output controller 15. Accordingly, when any image data file which has not yet been supplied to the printer 30 still remains in HD 14, such a command as "change print size" is displayed to request the operator to alter the setting of the print size. Therefore, such a mistake as forgetting of printing is prevented. Furthermore, because an operator is not required to judge whether there is any image data file which has not yet been used for printing, the process can be quickly performed.

The image processing device according to the present invention is applicable to a case where images other than photographic images are printed by using a printer at a place other than the photograph lab, for example, a general office or the like.

The output of the signal for demanding the change of the print size to the operator by the demanding signal output controller 15 is not limited to the manner by way of the display 21a, but a manner by way of voice or the like. Further, the image processing device 1 maybe designed so that the demanding signal output controller 15 is not equipped, and therefore, the steps S13 and S14 may be omitted so that the change of the print size is not demanded to the operator.

In FIG. 2, HD 14 may be replaced by another external auxiliary storage device connected to the image processing device 1 with data exchangeable. In this case, an image data file in correspondence with a print size different from the set print size is stored not in HD 14 but in the external auxiliary storage device in step S10. The image data file may be extracted from the external auxiliary storage device and stored in the image data memory 11 by the image data retriever 16.

Furthermore, the image data retriever 16 maybe omitted. That is, the image data file may not be temporarily stored in HD 14 or the auxiliary storage device by the image data supply controller 13. Accordingly, the steps S9 and S10 are omitted, and the image data file in correspondence with a print size different from the set print size is kept to be stored in the image data memory 11. This case is possible as far as the image data memory 11 is designed to have a sufficient storage capacity.

Still furthermore, the print size memory 10 may be omitted. In this case, the process of the step S2 is omitted, however, the image processing device 1 may be designed so that only the image data file in correspondence with the print size same as paper loaded in the printer 30, of the files stored in the image data memory 11, is supplied to the printer 30, by using various methods such as directly transmitting the information on the loaded paper size from the printer 30 to the image data supply controller 13.

The image processing device of this invention is applicable to not only a case where plurality of orders are processed, but also a case where only one order is processed. Furthermore, in the above embodiment plurality of image data files are included in one order and only one print size is specified for each image data file. However, one order may include only one image data file, or plurality of print sizes may be specified for one image data file.

In case plurality of print sizes are specified for one image data file, when supplied to the printer, files are checked whether they are to be used for printing also in a size other than set print size and not handled yet. If the file is to be used for printing in a size other than set print size and not handled yet, the copy of the file is temporally stored in HD 14. Thus, even when plurality of print sizes are specified for one image data file, the printing can be performed smoothly.

In the above-described embodiment, the image data file of each order are recorded in a recording medium, and therefore, loading the recording medium into the image processing device 1 and reading the data must be done. On the other hand, in case an order is given according to an order format on the Internet, data file based on the order format including an image data file and specified print size and quantity for each image data are downloaded to a computer of a photograph lab shop. Accordingly, an operator can handle the order by inputting using the keyboard 21b or the like without inserting a recording medium such as a memory card or the like.

Furthermore, in the above-described example, a list of process status as shown in FIGS. 5 and 6 can be shown on the display 21a, however, the image processing device may be designed so that such a list of process status is not displayed.

The present invention is applicable to a case where two or more magazines can be loaded in the paper loading section 30a of the printer 30. In this case also only one print size is set, and only the image data file in correspondence with the set print size is supplied to the image data memory 11 under the control of the image data supply controller 13. In this case of double magazines, the efficiency of the work can be enhanced by changing the setting of the print size to the size of paper contained in one magazine after printing of paper contained in the other magazine is finished. It is preferable that in the step S14 the size of the paper contained in the non-processed magazine is specified and an indication for changing the print size to the displayed size. Furthermore, an indication is preferably displayed to promote an operator to exchange the magazine containing printed paper for a magazine containing paper whose size is a non-processed and also different from any size of the paper contained in the double magazines at that time.

The flowchart of FIG. 3 is an example of the process carried out by the image processing device 1 according to this embodiment, and various other flowcharts may be considered. For example, the image processing device may be designed so that when a temporary stop button is pushed while print image data files are supplied to the printer 30 in step S8, the supply of the image data files to the printer 30 is temporarily stopped, even though the printing process by using all the image data files in correspondence with the set print size is not completed. Thereafter the print size may be changed according to an operator's judgment to carry out the printing in a print size different from the print size in which the printing is being carried out at the time when the supply of the image data files to the printer 30 is temporarily stopped.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image processing device comprising:
    an image data memory for storing a plurality of image data files, which are included in a plurality of orders regarding prints of a plurality of data files taken from a plurality of customers, in correspondence with at least any one of a plurality of print sizes;
    an image corrector for carrying out a correction process for the plurality of image data files stored in the image data memory; and
    an image data supply controller for controlling the plurality of image data files stored in the image data memory to be supplied to a printer so that each of the image data files is used for printing in a corresponding print size in accordance with the image data memory and an image data file in correspondence with a print size is prevented from being mixed with an image data file in correspondence with another print size.

2. An image processing device comprising:
    an image data memory for storing a plurality of image data files, which are included in a plurality of orders regarding prints of a plurality of data files taken from a plurality of customers, in correspondence with at least any one of a plurality of print sizes;
    an image corrector for carrying out a correction for the plurality of image data files stored in the image data memory;
    a print size memory for storing a print size for a printer; and
    an image data supply controller for controlling an image data file in correspondence with the same print size as stored in the print size memory, of the plurality of image data files stored in the image data memory, to be supplied to the printer so as to be used for printing in a corresponding print size.

3. The image processing device according to claim 2,
    wherein the image data supply controller controls an image data file in correspondence with a print size different from one stored in the print size memory, of the plurality of image data files stored in the image data memory, to be supplied to an auxiliary storage device, and
    further comprises an image data retriever for retrieving an image data file in correspondence with a print size stored in the print size memory after a storage content thereof has been changed, of the image data file stored in the auxiliary storage device, and storing the image data file into the image data memory again.

4. The image processing device according to claim 2, further comprising a demanding signal output controller for controlling, when there exists an image data file which has not yet been supplied to the printer, a signal for demanding an operator to change a storage content of the print size memory to be outputted.

5. A computer-readable medium encoded with a computer program comprising:
    an image data memory for storing a plurality of image data files, which are included in a plurality of orders regarding prints of a plurality of data files taken from a plurality of customers, in correspondence with at least any one of a plurality of print sizes;
    an image corrector for carrying out a correction process for the plurality of image data files stored in the image data memory; and
    an image data supply controller for controlling the plurality of image data files stored in the image data memory to be supplied to a printer so that each of the image data files is used for printing in a corresponding print size in accordance with the image data memory and an image data file in correspondence with a print size is prevented from being mixed with an image data file in correspondence with another print size.

6. A computer-readable medium encoded with a computer program comprising:
    an image data memory for storing a plurality of image data files, which are included in a plurality of orders regarding prints of a plurality of data files taken from a plurality of customers, in correspondence with at least any one of a plurality of print sizes;
    an image corrector for carrying out a correction for the plurality of image data files stored in the image data memory;
    a print size memory for storing a print size for a printer; and
    an image data supply controller for controlling an image data file in correspondence with the same print size as stored in the print size memory, of the plurality of image data files stored in the image data memory, to be supplied to the printer so as to be used for printing in a corresponding print size.

7. The computer-readable medium encoded with a computer program according to claim 6,
    wherein the image data supply controller controls an image data file in correspondence with a print size different from one stored in the print size memory, of the plurality of image data files stored in the image data memory, to be supplied to an auxiliary storage device, and
    further comprises an image data retriever for retrieving an image data file in correspondence with a print size stored in the print size memory after a storage content thereof has been changed, of the image data file stored in the auxiliary storage device, and storing the image data file into the image data memory again.

8. The computer-readable medium encoded with a computer program according to claim 6,
    further comprising a demanding signal output controller for controlling, when there exists an image data file which has not yet been supplied to the printer, a signal for demanding an operator to change a storage content of the print size memory to be outputted.

* * * * *